US009731589B2

(12) United States Patent
Gersten et al.

(10) Patent No.: US 9,731,589 B2
(45) Date of Patent: Aug. 15, 2017

(54) HYBRID DRIVE ARRANGEMENT OF A MOTOR VEHICLE

(71) Applicant: ZF Friedrichshafen AG, Friedrichshafen (DE)

(72) Inventors: Rayk Gersten, Friedrichshafen (DE); Markus Baur, Deggenhausertal (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/302,595

(22) PCT Filed: Apr. 14, 2015

(86) PCT No.: PCT/EP2015/057998
§ 371 (c)(1),
(2) Date: Oct. 7, 2016

(87) PCT Pub. No.: WO2015/172955
PCT Pub. Date: Nov. 19, 2015

(65) Prior Publication Data
US 2017/0057335 A1   Mar. 2, 2017

(30) Foreign Application Priority Data
May 14, 2014   (DE) .......................... 10 2014 209 056

(51) Int. Cl.
*B60K 6/405*   (2007.10)
*B60K 6/365*   (2007.10)
(Continued)

(52) U.S. Cl.
CPC .............. *B60K 6/405* (2013.01); *B60K 6/365* (2013.01); *B60K 6/40* (2013.01); *B60K 6/54* (2013.01);
(Continued)

(58) Field of Classification Search
CPC . B60K 6/405; B60K 6/20; B60K 6/40; B60K 6/26; F16K 31/12; Y02T 10/6252
See application file for complete search history.

(56) References Cited

U.S. PATENT DOCUMENTS

2004/0150271 A1   8/2004   Koga et al.
2005/0264115 A1*  12/2005  Su .......................... H02K 5/18
                                                         310/89
(Continued)

FOREIGN PATENT DOCUMENTS

DE   10 2008 000 953 A1   10/2009
DE   10 2011 076 527 A1   11/2012
(Continued)

OTHER PUBLICATIONS

German Search Report Corresponding to 10 2014 209 056.3 mailed Jan. 23, 2015.
(Continued)

*Primary Examiner* — John Walters
*Assistant Examiner* — James Triggs
(74) *Attorney, Agent, or Firm* — Davis & Bujold, PLLC; Michael J. Bujold

(57) ABSTRACT

A hybrid drive arrangement of a motor vehicle, which has a main transmission having an input shaft and housing. An electric machine, that can operate either as a motor and a generator, has a stator and rotor which, on the input side, is connected to the main transmission. A planetary gearset is arranged between the rotor and the transmission input shaft. The transmission input shaft has a central oil bore and transverse bores for supplying oil to the planetary gearset and the electric machine. The planetary gearset and the electric machine are accommodated in a hybrid housing. The hybrid housing is connected to the transmission housing of the main transmission by an oil return line. The oil stream passing into the oil return line is in heat-transferring connection, by way of a partition wall, with a coolant which flows through a cooling duct arranged radially outside the stator.

7 Claims, 2 Drawing Sheets

(51) Int. Cl.
   *B60K 6/40* (2007.10)
   *F16H 57/04* (2010.01)
   *B60K 6/54* (2007.10)

(52) U.S. Cl.
   CPC ...... *F16H 57/0476* (2013.01); *B60Y 2306/05* (2013.01); *B60Y 2400/60* (2013.01); *B60Y 2400/73* (2013.01); *F16H 57/042* (2013.01)

(56) References Cited

U.S. PATENT DOCUMENTS

| | | |
|---|---|---|
| 2008/0164100 A1 | 7/2008 | Iraha et al. |
| 2009/0107769 A1 | 4/2009 | Sato et al. |
| 2012/0293027 A1 | 11/2012 | Sakurada et al. |
| 2016/0121708 A1 | 5/2016 | Gersten et al. |

FOREIGN PATENT DOCUMENTS

| | | |
|---|---|---|
| DE | 10 2011 082 185 A1 | 3/2013 |
| DE | 10 2013 211 225 A1 | 12/2014 |
| JP | 2004-248402 A | 9/2004 |
| WO | 2014/202280 A1 | 12/2014 |

OTHER PUBLICATIONS

International Search Report Corresponding to PCT/EP2015/057998 mailed Jun. 22, 2015.
Written Opinion Corresponding to PCT/EP20151057998 mailed Jun. 22, 2015.

* cited by examiner

HYBRID DRIVE ARRANGEMENT OF A MOTOR VEHICLE

This application is a National Stage completion of PCT/EP2015/057998 filed Apr. 14, 2015, which claims priority from German patent application serial no. 10 2014 209 056.3 filed May 14, 2014.

FIELD OF THE INVENTION

The invention concerns a hybrid drive arrangement of a motor vehicle, comprising a main transmission with a transmission input shaft and a transmission housing, an electric machine with a stator and a rotor that can operate as a motor and as a generator, which is connected to the main transmission on its input side, and a planetary gearset arranged between the rotor and the transmission input shaft, wherein the transmission input shaft has a central oil bore and transverse bores for supplying oil to the planetary gearset and the electric machine, wherein the planetary gearset and the electric machine are accommodated in a hybrid housing and wherein the hybrid housing is connected to the transmission housing of the main transmission by way of an oil return conduit.

BACKGROUND OF THE INVENTION

In the older application by the present applicant with file number DE 10 2013 211 225.4, also filed as U.S. patent application Ser. No. 14/895,009 (now US Publication No. 2016/0121708) a hybrid drive arrangement of this type is disclosed, which comprises an electric machine that rotates with relatively high rotational speed, whose rotational speed is stepped down via step-down gearing in the form of a planetary gearset to a relatively lower rotational speed of the transmission input shaft. A problem with such a hybrid module is the cooling of the electric machine, on the one hand, and of the planetary gearset, on the other hand. In the arrangement according to the older application cooling takes place essentially by an oil stream tapped from and returned back to the oil circuit of the main transmission, which therefore forms a secondary oil circuit. This secondary oil circuit, which lubricates and cools the hybrid module, is shown in FIGS. 4 and 5 of the older application. In this case, the oil supply takes place by way of the transmission input shaft centrally and in the axial direction, so that the oil flow passes via the rotating components from the inside outward and is returned to the transmission housing and into the sump of the main transmission by way of an oil return conduit that connects the hybrid housing to the housing of the main transmission. Thus, the heat absorbed by the oil in the hybrid module is conveyed as an additional heat input into the transmission oil circuit.

SUMMARY OF THE INVENTION

Starting from the aforesaid older application, the purpose of the present invention is to improve the cooling of the hybrid arrangement.

This improvement is achieved by virtue of the characteristics described below, namely essentially in that some of the heat absorbed by the oil flow is given up to the coolant that cools the stator and does not reach the main transmission as heat input. Thus, in the hybrid module heat transfer takes place between the returning oil flow, which is at a higher temperature, and the flow of coolant flowing round the stator, which is at a lower temperature. Thus, some of the waste heat is conveyed directly into the coolant circuit of the internal combustion engine of the vehicle. Accordingly, the main transmission is less thermally stressed by the hybrid module.

In a preferred embodiment, the cooling duct that surrounds the stator has a heat-conducting partition wall past which the oil flow is guided. Thus, the oil flow gives up some of its heat, by heat transfer and heat conduction, to the partition wall and from there to the coolant flowing on the other side of the partition wall. Since the oil is at a temperature considerably higher than that of the coolant, a sufficiently large temperature reduction is achieved.

According to another preferred embodiment, under the cooling duct is arranged geodetically an oil cooling chamber through which the oil to be returned flows. The oil cooling chamber is separated from the cooling duct by the partition wall. The cross-section of the oil cooling chamber is made large enough for the speed of flow of the oil to be slowed, so that the dwell time of the oil in the cooling chamber is relatively long. This provides favorable conditions for a considerable proportion of the waste heat to be transferred to the coolant.

In a further preferred embodiment, the oil cooling chamber is arranged in the hybrid housing, i.e. the oil cooling chamber can be made with relatively little modification of the transmission housing.

According to another preferred embodiment, the oil cooling chamber has an inlet and an outlet opening, i.e. the oil cooling chamber extends transversely (in the axial direction of the transmission input shaft) through the hybrid housing. The inlet and outlet openings are in flow connection with the oil sump of the electric machine and the planetary gearset.

In a further preferred embodiment, the outlet opening is arranged in the inlet area of the oil return conduit, i.e. the oil to be returned, already pre-cooled, passes from the oil cooling chamber directly into the oil return duct.

BRIEF DESCRIPTION OF THE DRAWINGS

An example embodiment of the invention is illustrated in the drawing and is described in more detail below, so that from the description and/or the drawing further features and/or advantages can emerge. The figures show.

DETAILED DESCRIPTION OF THE PREFERRED EMBODIMENTS

Figure 1:
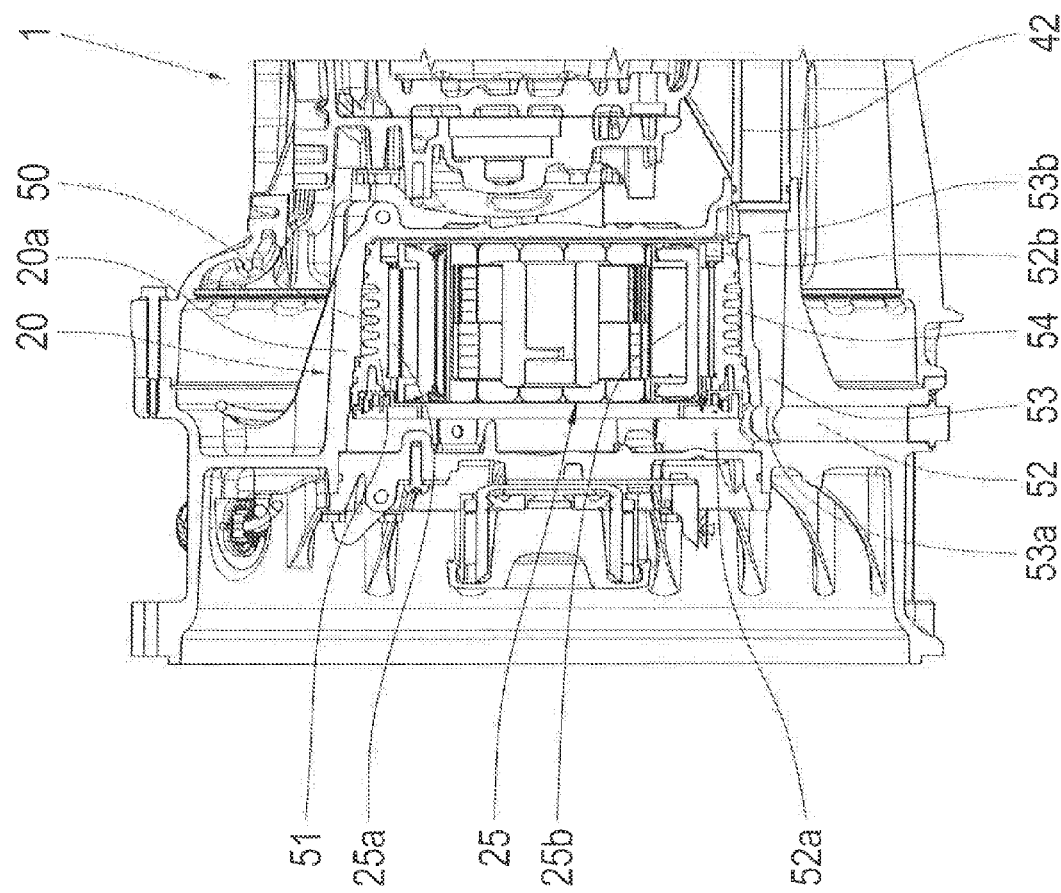
FIG. 1: An axial section through the hybrid drive arrangement according to the invention, with the oil cooling chamber.

FIG. 1 shows a hybrid drive arrangement 1, which corresponds essentially to the arrangement according to FIGS. 4 and 5 of the older US Publication No. 2016/0121708, especially so far as the oil supply is concerned; the older US Publication No. 2016/0121708, to its full extent, is incorporated in the disclosure content of the present application by reference to US Publication No. 2016/0121708. FIG. 1 shows a hybrid housing 20 in which is arranged an electric machine 25 comprising a stator 25a and a rotor 25b. Between the hybrid housing 20 and the stator 25a is arranged an annular cooling duct 50, through which flows the coolant from a cooling circuit (not shown) for the internal combustion engine of the motor vehicle. The cooling duct 50 is delimited on the outside by an outer wall 20a, which in this case is part of the hybrid housing 20, and on the inside by a finned cooling jacket 51. Thus the cooling duct 50 is bounded on its radially inner side by the cooling jacket 51 and on its radially outer side by the outer wall 20a, so that the cooling jacket 51 is set into the hybrid housing 20 and sealed on both sides of the cooling duct 50. The oil supplied through the transmission input shaft (not shown here) is flung outward by the rotating components of the electric machine 25 and those of the planetary gearset (not shown), and passes into an oil sump 52 in the part of the hybrid housing 20 located geodetically at the bottom, the oil sump 52 having an oil chamber 52a on the left in the drawing and an oil chamber 52b on the right in the drawing, i.e. on either side of the electric machine 25. In the drawing an oil cooling chamber 53 is arranged under the electric machine 25, which has an inlet opening 53a and an outlet opening 53b and which is in flow connection with the two oil chambers 52a, 52b of the oil sump. To the hybrid housing 20 is connected an oil return conduit 42, also called an oil return duct 42. Thus, the oil return duct 42 is in flow connection with the oil sump of the main transmission (not shown). The oil cooling chamber 53 is delimited at the top, i.e. toward the cooling duct 50, by the outer wall 20a of the hybrid housing 20, and in the area of the oil cooling chamber 53, the outer wall 20a is designed as a heat-conducting partition wall 54. In this context the term "heat-conducting" means that the partition wall 54 is designed as the wall of a heat exchanger and is particularly suitable for transferring heat from the oil stream flowing through the oil cooling chamber 53 to the coolant stream in the cooling duct 50. As can be seen from the drawing, the oil return conduit 42 is arranged geodetically approximately at the same level as the outlet opening 53b of the oil cooling chamber 53 so that the returning oil stream can be drained away into the oil sump of the main transmission without further flow deflections or obstacles, i.e. in a relatively loss-free manner. The flow cross-section of the oil cooling chamber 53 (perpendicular to the plane of the drawing) is made relatively large, so that the flow velocity in the oil cooling chamber 53 is relatively low and the dwell time of the oil in the oil cooling chamber 53 is relatively long. This promotes heat transfer from the hot oil stream into the cooler coolant stream.

Figure 2:
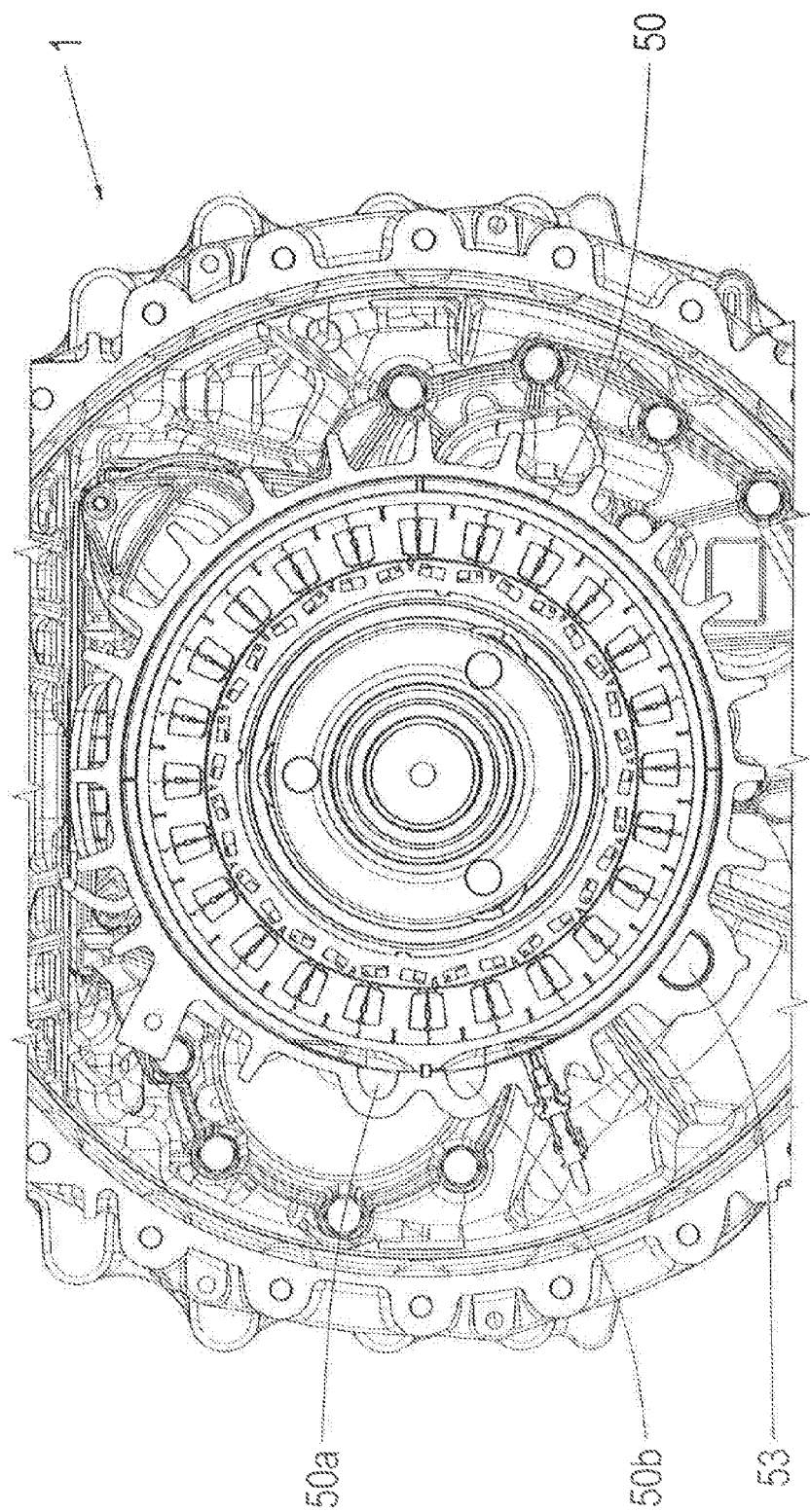
FIG. 2: A view of the hybrid drive arrangement in the axial direction.

FIG. 2 shows a view in the axial direction of the hybrid drive arrangement 1, in which the enlarged, kidney-shaped cross-section of the oil cooling chamber 53 can be recognized. Radially inside the oil cooling chamber 53, the annular cooling duct 50 can be seen, this having an inlet opening 50a and an outlet opening 50b for the coolant. As already mentioned, the cooling duct 50 is in flow connection with the coolant circuit of the internal combustion engine.

Otherwise than in the embodiment illustrated in the drawing, it is also within the scope of the invention for coolant also to flow along the radially outer side of the oil cooling chamber, thereby cooling the latter additionally.

INDEXES

1 Hybrid drive arrangement
20 Hybrid housing
20a Outer wall
25 Electric machine
25a Stator
25b Rotor
42 Oil return conduit
50 Cooling duct
50a net opening
50b Outlet opening
51 Cooling jacket
52 Oil sump
52a Oil chamber
52b Oil chamber
53 Oil cooling chamber
53a net opening
53b Outlet opening
54 Partition wall

The invention claimed is:

1. A hybrid drive arrangement for a motor vehicle, the hybrid drive arrangement comprising:
 a main transmission with a transmission input shaft and a transmission housing,
 an electric machine (25) being operable as a motor and as a generator and comprising a stator (25a) and a rotor (25b), and the electric machine (25) being connected to an input side of the main transmission,
 a planetary gearset being arranged between the rotor (25b) and the transmission input shaft,
 the transmission input shaft having a central oil bore and transverse bores for supplying oil to the planetary gearset and the electric machine (25),
 the planetary gearset and the electric machine (25) being accommodated in a hybrid housing (20),
 the hybrid housing (20) being connected to the transmission housing of the main transmission by way of an oil return line (42),
 a cooling duct (50) being arranged radially outside the stator (25a) through which coolant flows, and
 an oil stream passing into the oil return line (42) is in heat-transferring connection with the coolant.

2. The hybrid drive arrangement according to claim 1, wherein the cooling duct (50) has a heat-conducting partition wall (54) past which the oil stream flows.

3. The hybrid drive arrangement according to claim 1, wherein an oil cooling chamber (53), through which the oil stream can flow and which is delimited relative to the cooling duct (50) by a heat-conducting partition wall (54), is arranged geodetically under the cooling duct (50).

4. The hybrid drive arrangement according to claim 3, wherein the oil cooling chamber (53) is arranged in the hybrid housing (20).

5. The hybrid drive arrangement according to claim 3, wherein the oil cooling chamber (53) has an inlet opening and an outlet opening (53a, 53b).

6. The hybrid drive arrangement according to claim 5, wherein the outlet opening (53b) is arranged in an inlet area of the oil return line (42).

7. A hybrid drive arrangement of a motor vehicle, the hybrid drive arrangement comprising:
 a main transmission having a transmission input shaft;
 a transmission housing;
 an electric machine being operable as a motor and a generator, the electric machine having a stator and a rotor, the rotor being connected to an input side of the main transmission, and the stator being radially surrounded by a cooling jacket which is radially surrounded by a hybrid housing;
 a planetary gearset being arranged between the rotor and the transmission input shaft, and the transmission input shaft having a central oil bore and transverse bores for supplying oil to the planetary gearset and the electric machine;
 the planetary gearset and the electric machine being accommodated in the hybrid housing, and the hybrid housing being connected to the transmission housing of the main transmission by way of an oil return conduit;

a cooling passage being radially defined by the cooling jacket and the hybrid housing, and the hybrid housing comprising a heat-conducting partitioning wall having a radially interior surface and a radially exterior surface; and a coolant within the cooling passage flows across the radially interior surface of the partitioning wall and an oil stream within the oil return conduit flowing across the radially exterior surface of the partitioning wall to facilitate transfer of heat from the coolant in the cooling passage through the partitioning wall to the oil stream in the oil return conduit.

* * * * *